(12) United States Patent
Ishikawa

(10) Patent No.: US 8,260,000 B2
(45) Date of Patent: Sep. 4, 2012

(54) ACTION ESTIMATING APPARATUS, METHOD FOR UPDATING ESTIMATION MODEL, AND PROGRAM

(75) Inventor: Takahiro Ishikawa, Nagoya (JP)

(73) Assignee: DENSO CORPORATION, Kariya (JP)

( * ) Notice: Subject to any disclaimer, the term of this patent is extended or adjusted under 35 U.S.C. 154(b) by 372 days.

(21) Appl. No.: 12/654,476

(22) Filed: Dec. 22, 2009

(65) Prior Publication Data

US 2010/0158316 A1 Jun. 24, 2010

(30) Foreign Application Priority Data

Dec. 24, 2008 (JP) ................. 2008-327607

(51) Int. Cl.
G06K 9/62 (2006.01)
(52) U.S. Cl. ........ 382/103; 382/159; 382/218; 348/148; 348/E7.085
(58) Field of Classification Search .............. 382/103, 382/159, 218; 348/148, E7.085
See application file for complete search history.

(56) References Cited

U.S. PATENT DOCUMENTS

| | | | |
|---|---|---|---|
| 2008/0130953 A1 | 6/2008 | Ishikawa | |
| 2009/0034794 A1 | 2/2009 | Ishikawa | |

FOREIGN PATENT DOCUMENTS

| | | |
|---|---|---|
| JP | A-2003-109015 | 4/2003 |
| JP | A-2005-063090 | 3/2005 |
| JP | A-2005-205943 | 8/2005 |
| JP | A-2008-140268 | 6/2008 |
| JP | A-2008-146356 | 6/2008 |
| JP | 2008-206868 | 8/2008 |
| JP | A-2009-069975 | 4/2009 |

OTHER PUBLICATIONS

Fujioka: JP2005-205943-Eng, the english version of JP2005-205943, which is translated by machine.*
Fujioka: JP2005-205943-Eng, which is a english version translated by machine on Feb. 9, 2012.*
Office Action mailed Sep. 21, 2010 issued from the Japan Patent Office for corresponding Japanese patent application No. 2008-327607 (English translation enclosed).

* cited by examiner

Primary Examiner — Matthew Bella
Assistant Examiner — Ruiping Li
(74) Attorney, Agent, or Firm — Posz Law Group, PLC

(57) ABSTRACT

A storage unit stores a model defining a position or a locus of a feature point of an occupant in each specific action. An action estimation unit compares the feature point with each of the models to detect an estimated action. A detecting unit detects that a specific action is being performed as a definite action. A first generating unit generates a new definite model corresponding to the definite action by modifying a position or a locus of the feature point according to an in-action feature point when the definite action is being performed. A second generating unit generates a new non-definite model using the in-action feature point according to a correspondence between the feature point in the definite action and the feature point of a non-definite model other than the definite model. An update unit updates the definite action model and the non-definite action model.

4 Claims, 8 Drawing Sheets

FIG. 9

| CONTENTS | TIME POINT | | |
|---|---|---|---|
| SHIFT LEVER CONTINUOUS MANIPULATION | T3-T4 | T7-T8 | |
| STEERING CONTINUOUS MANIPULATION | T1-T2 | T5-T6 | T11-T12 |
| ⋮ | | | |
| AC CONTINUOUS MANIPULATION | T9-T10 | | |

2
ACTION ESTIMATING APPARATUS, METHOD FOR UPDATING ESTIMATION MODEL, AND PROGRAM

CROSS REFERENCE TO RELATED APPLICATIONS

This application is based on and incorporates herein by reference Japanese Patent Application No. 2008-327607 filed on Dec. 24, 2008.

FIELD OF THE INVENTION

The present invention relates to an action estimating apparatus configured to estimate an action of an occupant of a movable object. The present invention further relates to a program configured to be executed by a computer, as a section of the action estimating apparatus. The present invention further relates to a method for updating an estimation model.

BACKGROUND OF THE INVENTION

For example, JP-A-2005-205943 discloses an action estimating apparatus mounted in a vehicle for estimating an action performed by an occupant of the vehicle. The action estimating apparatus of JP-A-2005-205943 includes an image device and an image processing device. The image device obtains a photograph including a driver. The image processing device determines existence of a dangerous action based on the photograph obtained by the image device. The dangerous action is, for example, an action (telephone use action) for using a cellular phone when a driver is driving the vehicle. In the image processing device, a predetermined region, in which a hand of a driver is located at a high possibility in the telephone use action, is beforehand set around the face of the driver in a photographic image. When the hand is continually located in the predetermined region of the photographic image for a predetermined time period or more, it is determined that the driver is performing the telephone use action. In addition to the telephone use action, the dangerous action may further include lifting of a hand from a steering wheel to manipulate an air-conditioner or a navigation device and lifting of a hand from a steering wheel to swing a shoulder and an arm. However, the action estimating apparatus of JP-A-2005-205943 only determines whether the telephone use action is performed according to a position of a hand in a photographic image. Thus, even when a driver performs a dangerous action other than the telephone use action, the action estimating apparatus cannot detect the dangerous action.

SUMMARY OF THE INVENTION

In view of the foregoing and other problems, it is an object of the present invention to produce an action estimating apparatus in which detection accuracy of an estimated action is enhanced. It is another object of the present invention to produce a method for updating an estimation model.

In view of JP-A-2005-205943, the inventor of the present application proposes an action estimating apparatus in Japanese patent application 2007-203111. The action estimating apparatus includes an image processing device. Specifically, in the Japanese patent application 2007-203111, an action estimation model is prepared beforehand. In the action estimation model, a position or a locus of a feature point such as a person's wrist and an elbow obtained in a specific action is assigned to all of specific actions, which a driver may perform in a vehicle interior. Each of the action estimation models is compared with the position or the locus of the feature point detected from a photographic image. The image processing device detects an estimated action according to a degree of coincidence between the action estimation model and the position or the locus of the feature point. The estimated action is an action, which may be done by an occupant at a highest possibility.

The action estimation model is, in general, created to coincide with majority people. However, there is an individual difference in a detailed manner of a specific action and a feature of a body such as the length of a hand. Accordingly, there is a person who does not conform to the action estimation model. Accordingly, when such a person performs a specific action, the currently performed specific action may not be correctly detected. For example, a currently performed action may be recognized as another specific action. Alternatively, even when a person does not perform a specific action, an erroneous detection of a specific action may occur.

It is conceived that decrease in detection accuracy of an estimated action may occur due to individual difference between occupants.

According to one aspect of the present invention, an action estimating apparatus comprises an image acquisition unit configured to repeatedly obtain a photographic image of an occupant of a movable object. The action estimating apparatus further comprises a feature point detection unit configured to obtain feature point data indicating a position of a feature point of the occupant in the photographic image in response to obtaining of the photographic image by the image acquisition unit, the feature point being at least one predetermined point of a person's body. The action estimating apparatus further comprises a model storage unit configured to store action estimation models each defining a position or a locus of the feature point in each specific action, which an occupant may perform. The action estimating apparatus further comprises an action estimating unit configured to compare the feature point data obtained by the feature point detection unit with each of the action estimation models stored in the model storage unit to detect an estimated action, which is the specific action associated with the action estimation model, which is highest in a coincident degree. The action estimating apparatus further comprises a definite action detecting unit configured to detect that a definite action is being performed by the occupant using a method different from the comparison between the feature point data and the action estimation model, the definite action being at least one specific action specified beforehand. The action estimating apparatus further comprises a definite action model generating unit configured to generate a new definite action estimation model by modifying a position or a locus of the feature point, which constitutes a definite action estimation model, according to an in-action feature point, which is the feature point data obtained by the feature point detection unit when the definite action detecting unit detects the definite action performed by the occupant, the definite action estimation model being the action estimation model corresponding to the definite action. The action estimating apparatus further comprises a non-definite action model generating unit configured to generate a new non-definite action estimation model using an in-action feature point according to a predetermined correspondence between a position or a locus of the feature point when the occupant performs the definite action and a position or a locus of the feature point, which constitutes the non-definite action estimation model, which is the action estimation model corresponding to a non-definite action, the non-definite action being a specific action other than the definite action. The action estimating apparatus further comprises a model update unit configured to perform model update to: update the definite action estimation model stored in the model storage unit to the new definite action estimation model generated by the definite action model generating unit, and update the non-definite action estimation model stored in the model storage unit to the new non-definite action estimation model generated by the non-definite action model generating unit.

According to another aspect of the present invention, an action estimating apparatus comprises an acquisition unit configured to repeatedly obtain a photographic image of an occupant of a movable object. The action estimating apparatus further comprises a detection unit configured to obtain a position of a feature point of the occupant in the photographic image. The action estimating apparatus further comprises a storage unit configured to store models each defining a position or a locus of the feature point in each specific action, which an occupant may perform. The action estimating apparatus further comprises an estimating unit configured to compare the obtained position of the feature point with each of the stored models to detect an estimated action. The action estimating apparatus further comprises an action detecting unit configured to detect that a predetermined specific action is being performed as a definite action. The action estimating apparatus further comprises a first generating unit configured to generate a new definite model by modifying a position or a locus of the feature point, which constitutes a definite model of the stored models, according to the obtained position of the feature point being performed by the occupant. The action estimating apparatus further comprises a second unit configured to generate a new non-definite model using the obtained position of the feature point being performed by the occupant according to a predetermined correspondence between a position or a locus of the feature point when the definite action is being performed and a position or a locus of the feature point, which constitutes a non-definite model other than the definite model. The action estimating apparatus further comprises an update unit configured to update the stored definite model to the new definite model and update the stored non-definite model to the new non-definite model.

According to another aspect of the present invention, a method for estimating an action of an occupant, the method comprises repeatedly obtaining a photographic image of an occupant of a movable object. The method further comprises obtaining feature point data indicating a position of a feature point of the occupant in the photographic image in response to obtaining of the photographic image, the feature point being at least one predetermined point of a person's body. The method further comprises comparing the obtained feature point data with each stored action estimation model defining a position or a locus of the feature point in each specific action, which an occupant may perform to detect an estimated action, which is the specific action associated with the action estimation model, which is highest in a coincident degree. The method further comprises detecting a definite action being performed by the occupant, the definite action being at least one specific action specified beforehand. The method further comprises generating a new definite action estimation model by modifying a position or a locus of the feature point, which constitutes a definite action estimation model, according to an in-action feature point, which is the obtained feature point data when detecting the definite action, the definite action estimation model being the action estimation model corresponding to the definite action. The method further comprises generating a new non-definite action estimation model using an in-action feature point according to a predetermined correspondence between a position or a locus of the feature point when the occupant performs the definite action and a position or a locus of the feature point constituting the non-definite action estimation model, which is the action estimation model corresponding to a non-definite action, the non-definite action being a specific action other than the definite action. The method further comprises updating the stored definite action estimation model to the generated new definite action estimation model. The method further comprises updating the stored non-definite action estimation model to the generated new non-definite action estimation model.

BRIEF DESCRIPTION OF THE DRAWINGS

The above and other objects, features and advantages of the present invention will become more apparent from the following detailed description made with reference to the accompanying drawings. In the drawings:

FIG. 9 is a flow chart showing an outline of definite action information.

DETAILED DESCRIPTION OF PREFERRED EMBODIMENTS

Figure 1:
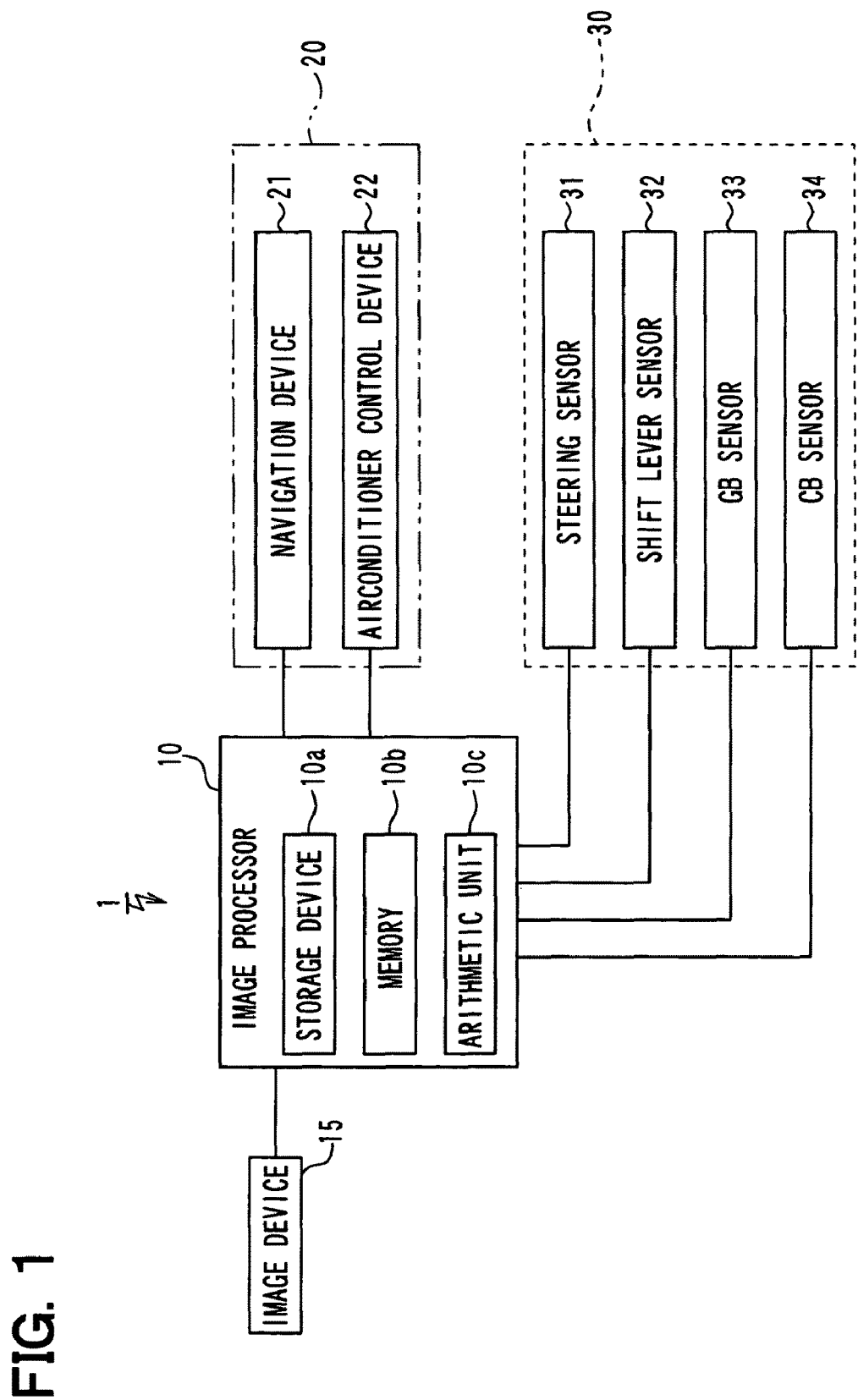
FIG. 1 is a block diagram showing an action estimating apparatus.

FIG. 1 is a block diagram showing an overview of an action estimation system mounted in a vehicle such as an automobile. Below, the vehicle mounted with an action estimation system 1 is specified as a self-vehicle.

<Structure>

As shown in FIG. 1, the action estimation system 1 includes an image device 15 for obtaining an image of at least a driver as an image object and an image processor 10 for processing the image obtained by using the image device 15 so as to estimate an action of the driver. Further, in the action estimation system 1, a controlled device group 20 is connected to the image processor 10. The controlled device group 20 includes multiple devices in the self-vehicle.

The controlled device group 20 includes a navigation device 21, which performs generally-known route guidance and the like, and an airconditioner control device 22, which controls an airconditioner for controlling air conditioning in an interior of the vehicle.

The navigation device 21 is a generally-known device including an instruction portion (navigation instruction portion), a speaker, a display device, and a control device. The navigation instruction portion includes devices such as a mechanical button and a touch panel for accepting input of an instruction of a user. The control device performs route guidance to a destination according to an instruction inputted by using the navigation instruction portion. The navigation device 21 controls the speaker and the display device according to an instruction from the image processor 10.

The airconditioner control device 22 includes an instruction portion (AC instruction portion) and a control device. The AC instruction portion includes devices such as a mechanical button and a touch panel for accepting input of an instruction of a user. The control device controls the airconditioner according to an instruction inputted by using the AC instruction portion. The airconditioner control device 22 further performs a cool air blowing control for controlling cool air blown from the airconditioner to a driver according to a control instruction from the image processor 10.

The image device 15 is, for example, a generally-known digital camera for repeatedly outputting an image (photographic image) at a predetermined interval. The image device 15 is mounted such that a lens is directed toward a vehicle interior so as to obtain an image including at least a driver seated on a driver's seat and a manipulation device group including multiple manipulation devices in the vehicle interior.

In the present embodiment, the manipulation devices of the manipulation device group include a rearview mirror, a passenger seat, and an air outlet (air outlet of a blower at the right side and/or the left side) of the airconditioner, the navigation instruction portion, the AC instruction portion, a steering wheel, a shift lever, and the like. The manipulation devices may further include at least a glove box (GB) for accommodating items and a console box (CB).

<Image Processor>

As follows, the image processor will be described.

The image processor 10 includes a generally-known microcomputer as a main component. The microcomputer of the image processor 10 includes a storage device 10a such as a flash memory, a memory 10b, and an arithmetic unit 10c. The storage device 10a is a rewritable medium configured to hold a stored content even when power supply is terminated. The memory 10b temporarily stores data caused in the course of a processing. The arithmetic unit 10c executes a program stored in the storage device 10a and the memory 10b.

The storage device 10a stores a program configured to successively perform an image processing of an image obtained by the image device 15 for causing the arithmetic unit 10c to perform an action estimating operation to estimate an action of a driver and for controlling the controlled device group 20 according to a result of the estimation.

Further, the storage device 10a stores a feature list, which is referred to when the arithmetic unit 10c performs the action estimating operation, and multiple action estimation models.

The feature list is for detecting a feature point from a driver in an obtained image. The feature point is predetermined on a human body. The feature list includes at least an arm list and a head list. The arm list is used for detecting the feature point predetermined for an arm of a human body. The head list is used for detecting the feature point predetermined for a head, in particular, a face of a human body.

The arm list includes feature points of a human body containing at least a right shoulder, a left shoulder, a right elbow, a left elbow, a right wrist and a left wrist. The head list includes feature points of a human body containing at least a nose, an inner corner of a right eye, an inner corner of a left eye, an outer corner of a right eye, an outer corner of a left eye, a right corner of a mouth, a left corner of a mouth, a right tragion, and a left tragion.

<Action Estimation Model>

As follows, the action estimation model will be described.

The action estimation model is prepared by beforehand modeling a position and a locus of the feature point when a driver performs a predetermined specific action. The action estimation model is prepared for each of predetermined specific actions, which a driver may perform.

The action estimation model is classified into an in-vehicle device manipulation model, a carry-on item manipulation estimation model, a touch action estimation model, and a repeat action estimation model, according to contents of the specific action.

The in-vehicle device manipulation model is obtained by modeling an action for operating the manipulation device group as a specific action. The in-vehicle device manipulation model is classified into a continuous manipulation estimation model and a transitional action estimation model, according to contents of the specific action.

Figure 7A:
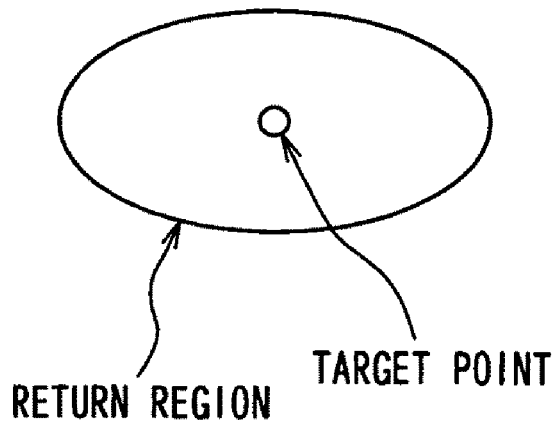
FIGS. 7A, 7B are explanatory views respectively showing an outline of a continuous manipulation estimation model and an outline of a transitional action estimation model.
Figure 7B:
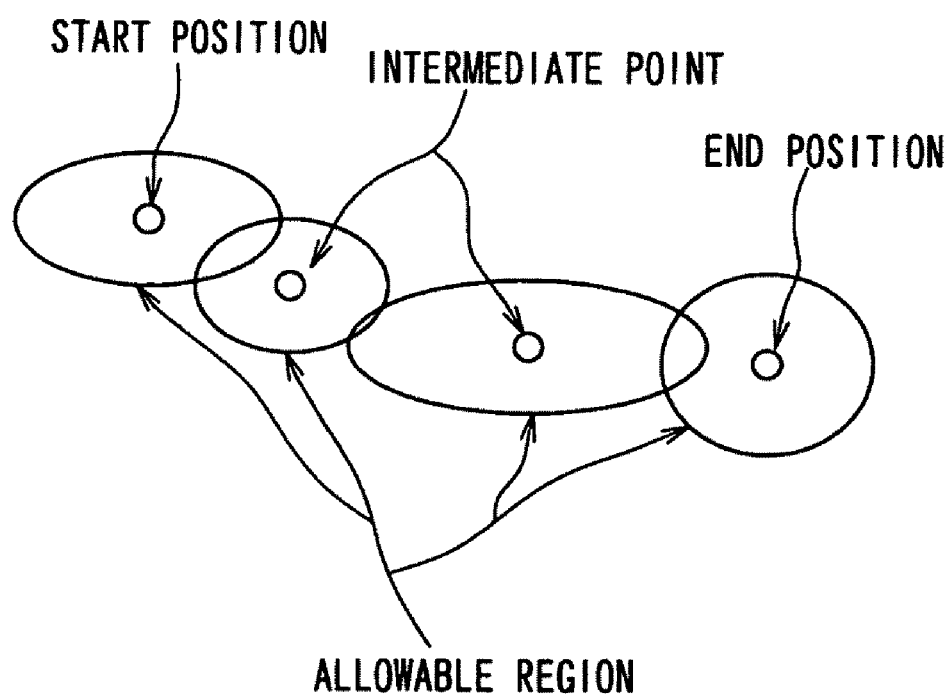
Figure 8A:
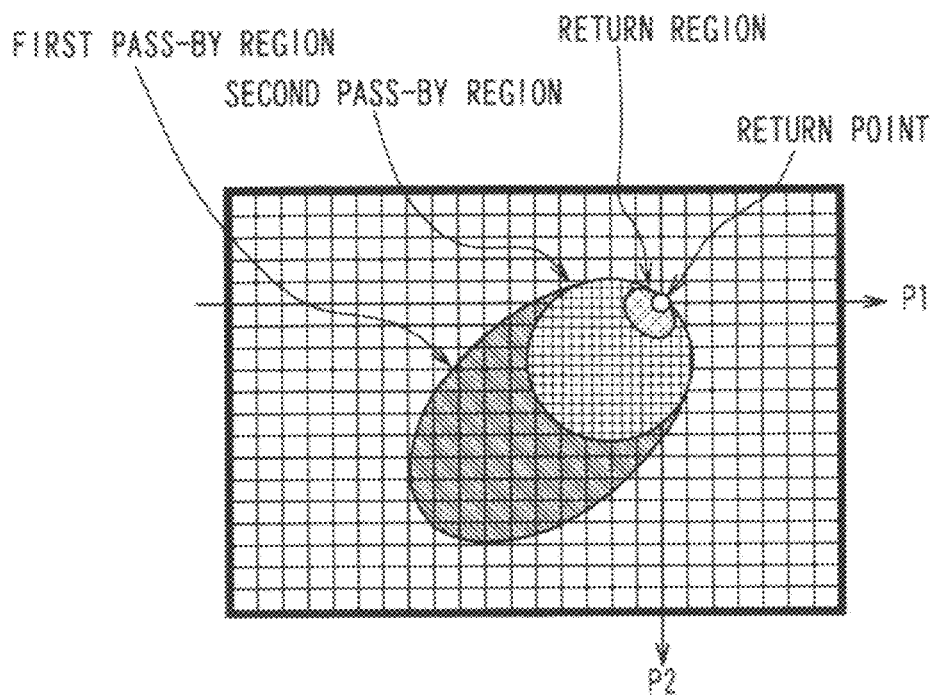
FIGS. 8A, 8B are explanatory views respectively showing an outline of a carry-on item manipulation estimation model and an outline of a repeat action estimation model.
Figure 8B:
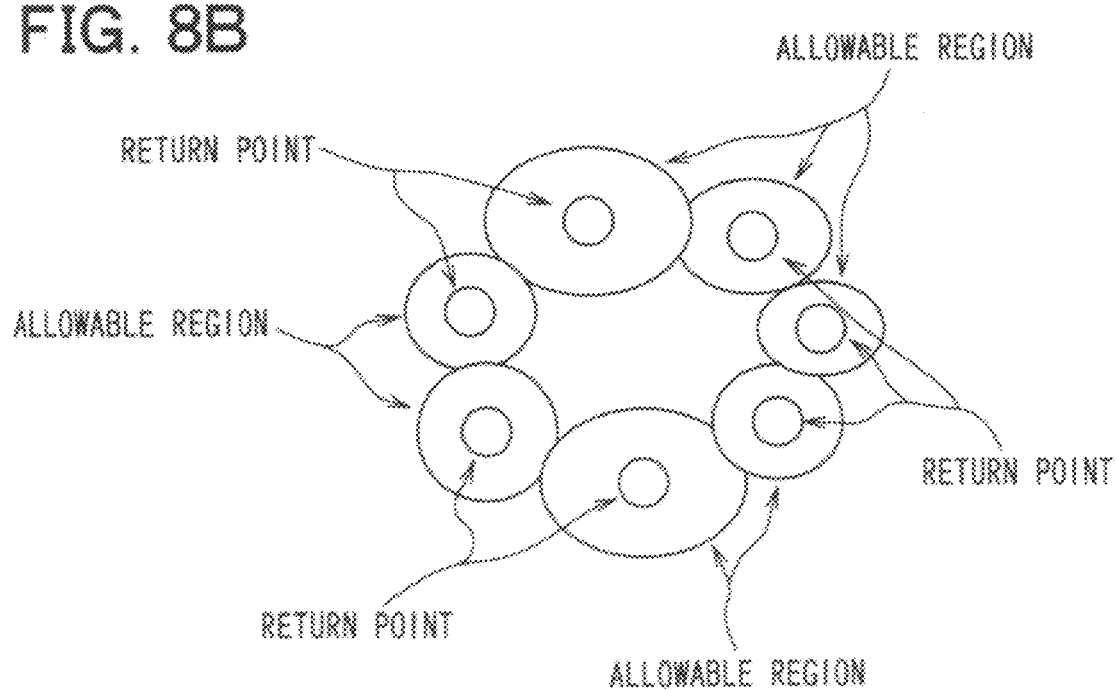

FIGS. 7A, 7B, 8A, 8B are explanatory views showing an outline of the action estimation model. Specifically, FIG. 7A is an explanatory view showing an outline of the continuous manipulation estimation model, and FIG. 7B is an explanatory view showing an outline of the transitional action estimation model. FIG. 8A is an explanatory view showing an outline of the carry-on item manipulation estimation model, and FIG. 8B is an explanatory view showing an outline of the repeat action estimation model.

The continuous manipulation estimation model is obtained by modeling a continuous manipulation of one device of the manipulation device group continually by a driver for more than a predetermined period, as a specific action. As shown in FIG. 7A, the continuous manipulation model specifies a locus, which is a congregate of a position (target point) of each feature point moving while a user manipulates a manipulation device. The continuous manipulation model further specifies a region (return region), in which the feature point is deemed to be existing in the target point. The continuous manipulation model specifies the target point and the return region for each of the manipulation devices. Below, names of the continuous manipulation and the continuous manipulation estimation model for each manipulation device are denoted by a combination of "manipulation device+continuous manipulation" and a combination of "manipulation device+continuous manipulation estimation model." For example, in a case where the manipulation device is the steering wheel, the names of the continuous manipulation and the continuous manipulation estimation model are denoted by a steering wheel continuous manipulation and a steering wheel continuous manipulation estimation model.

On the other hand, the transitional action estimation model is obtained by modeling a transitional action, when a driver moves a hand or the like from one manipulation device to another manipulation device, as a specific action. As shown in FIG. 7B, the transitional action estimation model specifies a start position of each feature point when starting movement, an end position of each feature point when ending the movement, and an intermediate point of each feature point in the movement from the start position to the end position. The transitional action estimation model further specifies an allowable region, in which the feature point is deemed to be existing for each of the start position, the end position, and the specific point (intermediate point). Below, names of the transitional manipulation and the transitional action estimation model are denoted by a combination of "a manipulation device, from which movement starts, to a manipulation device, at which the movement ends, +transitional manipulation" and a combination of "a manipulation device, from which movement starts, to a manipulation device, at which the movement ends, +transitional action estimation model." For example, in a case where a manipulation device, from which movement starts, is the steering wheel and a manipulation device, at which the movement ends, is a shift lever, the transitional action and the transitional action estimation model are denoted by a steering wheel to shift lever transitional action and a steering wheel to shift lever transitional action estimation model.

The carry-on item manipulation estimation model is obtained by modeling a manipulation of a carry-on item as a specific action. Specifically, the manipulation of a carry-on item is manipulation of a carry-on item carried in a vehicle interior. The manipulation of a carry-on item is, for example, eating, drinking, smoking, use of a telephone, and the like. As shown in FIG. 8A, the carry-on item manipulation estimation model specifies a return point, a return region, first and second pass-by regions, and a detection allowable range. To the return point, each feature point of the driver, who manipulated a carry-on item, returns. In the return region, each feature point of a driver can be deemed to be existing in the return point. Through the first and second pass-by region, each feature point of a driver, who is going to manipulate a carry-on item, passes. The detection allowable range defines a region in which each feature point of a driver, who is going to manipulate a carry-on item, passes through the pass-by region in a movable direction. Below, a name of each carry-on item manipulation estimation model is denoted by a combination of "carry-on item manipulation+estimation model." For example, when a telephone as a carry-on item is manipulated, the carry-on item manipulation estimation model is denoted by a telephone manipulation estimation model.

The touch action estimation model is obtained by modeling a touch action as a specific action. Specifically, the touch action estimation model is obtained by modeling a touch action of a driver to touch the driver's own body by hand when massaging a shoulder and an arm, for example. A specific action of the touch action estimation model is different from a corresponding specific action of the carry-on item manipulation estimation model. However, a structure of the touch action estimation model is similar to a structure of the carry-on item manipulation estimation model. Specifically, the touch action estimation model specifies the target point, the return region, the pass-by region, and the detection allowable range. Detection of an estimated action using the touch action estimation model is performed similarly to detection of an estimated action using the carry-on item manipulation estimation model. Accordingly, specific explanation of detection of a touch action is omitted.

The repeat action estimation model is obtained by modeling a repeat action as a specific action. Specifically, the repeat action estimation model is obtained by modeling a repeat action such as swinging of an arm and swinging of a shoulder, without using a device or an item such as a manipulation device and a carry-on item. As shown in FIG. 8B, the repeat action estimation model specifies multiple allowable regions, in which continually changing each feature point of a driver, who is performing a repeat action, may be located, and a center point (specific point) of each allowable region. Below, a name of each repeat action estimation model is denoted by a combination of "repeat action+estimation model." For example, when a repeat action is swinging of a shoulder (shoulder swing), the name of a repeat action estimation model is a shoulder swing estimation model.

As described above, the image processor 10 performs image processing of the position and the locus of the feature point detected from the image obtained from the image device 15. Further, the image processor 10 compares the position and the locus with each action estimation model. Thus, the image processor 10 detects the specific action, which corresponds to the action estimation model satisfying a condition, as an estimated action of a driver.

<Sensor Group>

Referring to FIG. 1, the image processor 10 is connected with a sensor group 30 for detecting manipulation of each specified manipulation device, which is a beforehand specified device in the manipulation device group.

In the present embodiment, at least the steering wheel, the shift lever, the GB, and the CB are specified as the specified manipulation devices. Correspondingly to the specified manipulation devices, the sensor group 30 includes a steering sensor 31, which detects manipulation of the steering wheel, a shift lever sensor 32, which detects manipulation of the shift lever, a GB sensor 33, which detects opening-and-closing of the GB, and a CB sensor 34, which detects opening-and-closing of the CB.

The steering sensor 31 has a sensing electrode embedded in each of a right and left portions of the steering wheel gripped by right and left hands. When the steering wheel is gripped, the steering sensor 31 outputs a steering wheel manipulation signal to the image processor 10. The shift lever sensor 32 has a sensing electrode embedded in a portion of the shift lever gripped by a hand. When the shift lever is gripped, the shift lever sensor 32 outputs a shift lever manipulation signal to the image processor 10.

The GB sensor 33 includes a switch, which is energized or de-energized to activate an electric light of the GB when the GB is opened. The CB sensor 34 includes a switch, which is energized or de-energized to activate an electric light of the CB when the CB is opened. The GB sensor 33 outputs a GB manipulation signal to the image processor 10 when the GB is opened. The CB sensor 34 outputs a CB manipulation signal to the image processor 10 when the CB is opened.

In the present embodiment, in addition to the steering wheel, the shift lever, the GB, and the CB, the navigation instruction portion and the AC instruction portion are further specified as specified manipulation devices.

The image processor 10 receives a navigation manipulation signal and an AC manipulation signal respectively via the navigation instruction portion and the AC instruction portion.

The image processor 10 determines whether a driver continually manipulates a specified manipulation device in accordance with manipulation signals from the sensor group 30 or a specified manipulation device. The storage device 10a stores a program executed by the arithmetic unit 10c to perform a definite action information generating operation so as to specify detected continuous manipulation as a definite action, which a driver has performed, in accordance with manipulation signals from the sensor group 30 or a specified manipulation device.

<Definite Action Information Generating Operation>

Subsequently, the definite information generating operation executed by the arithmetic unit 10c of the image processor 10 will be described.

Figure 2:
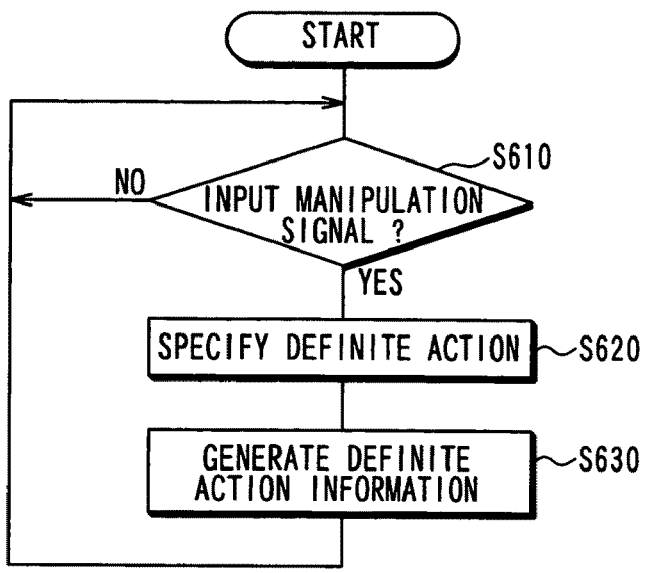
FIG. 2 is a flow chart showing a definite action information generating operation.

FIG. 2 is a flow chart showing the definite action information generating operation.

The definite information generating operation is started at a predetermined starting time point before a driver enters a self-vehicle. For example, the starting time point is determined at a time point when a door of the self-vehicle is unlocked.

As shown in FIG. 2, when the definite action information generating operation is started, at S610, it is first determined whether a manipulation signal is inputted from the sensor group 30 or a specified manipulation device. When it is determined that a manipulation signal is not inputted, the operation is held in a standby mode until a manipulation signal is inputted. When it is determined that a manipulation signal is inputted, the processing proceeds to S620.

At S620, a continuous manipulation of a specified manipulation device, which is being performed by a driver, is specified as a definite action based on an inputted manipulation signal.

Specifically, in the present embodiment, when the steering wheel manipulation signal is inputted, the steering wheel continuous manipulation, in which a driver is manipulating the steering wheel, is specified as a definite action. Alternatively, when the lever manipulation signal is inputted, the shift lever continuous manipulation, in which a driver is manipulating the shift lever, is specified as a definite action. Further, when the IG manipulation signal is inputted, an IG mechanism continuous manipulation, in which a driver is manipulating an ignition mechanism (IG mechanism), is specified as a definite action.

In addition, when a manipulation signal is inputted from the GB sensor 33, the GB continuous manipulation, in which a driver is manipulating the GB, is specified as a definite action. Alternatively, when a manipulation signal is inputted from the CB sensor 34, the CB continuous manipulation, in which a driver is manipulating the CB, is specified as a definite action. In addition, when the navigation manipulation signal is inputted, the navigation continuous manipulation, in which a driver is manipulating the navigation device 21, is specified as a definite action. Alternatively, when the AC manipulation signal is inputted, the AC continuous manipulation, in which a driver is manipulating the airconditioner control device 22, is specified as a definite action.

Subsequently, at S630, definite action information is generated by associating the definite action specified in S620 with a specific start time, at which the definite action started, and a specific end time, at which the definite action ended. Thus, the definite action information is stored in a predetermined area of the memory 10b.

In the present embodiment, as shown in FIG. 9, a definite action information table, which specifies the continuous manipulation of each specified manipulation device, is beforehand stored in the memory 10b. When input of a manipulation signal starts, the present time point is stored in a storage area of a specific action (continuous manipulation), which corresponds to the manipulation signal, in the definite action information table. When input of a manipulation signal ends, the present time point is stored in a storage area of a specific action (continuous manipulation), which corresponds to the manipulation signal, in the definite action information table. In this way, the definite action information is generated and stored in the memory 10b.

Thereafter, the processing returns to S610 and repeats steps S610 to S630.

As described above, in the definite action information generating operation, a continuous manipulation, which is detected according to a manipulation signal obtained from a specified manipulation device, is specified as a definite action. Furthermore, the definite action information, which is generated by associating the definite action with the specific start time and specific end time of the definite action, is stored. In the present embodiment, the specific start time, the specific end time, and a time period (specific time period), in which the definite action is specified, are associated with each other as the definite action information for each content of the definite action.

<Action Estimating Operation>

Subsequently, the action estimating operation executed by the arithmetic unit 10c of the image processor 10 will be described.

Figure 3:
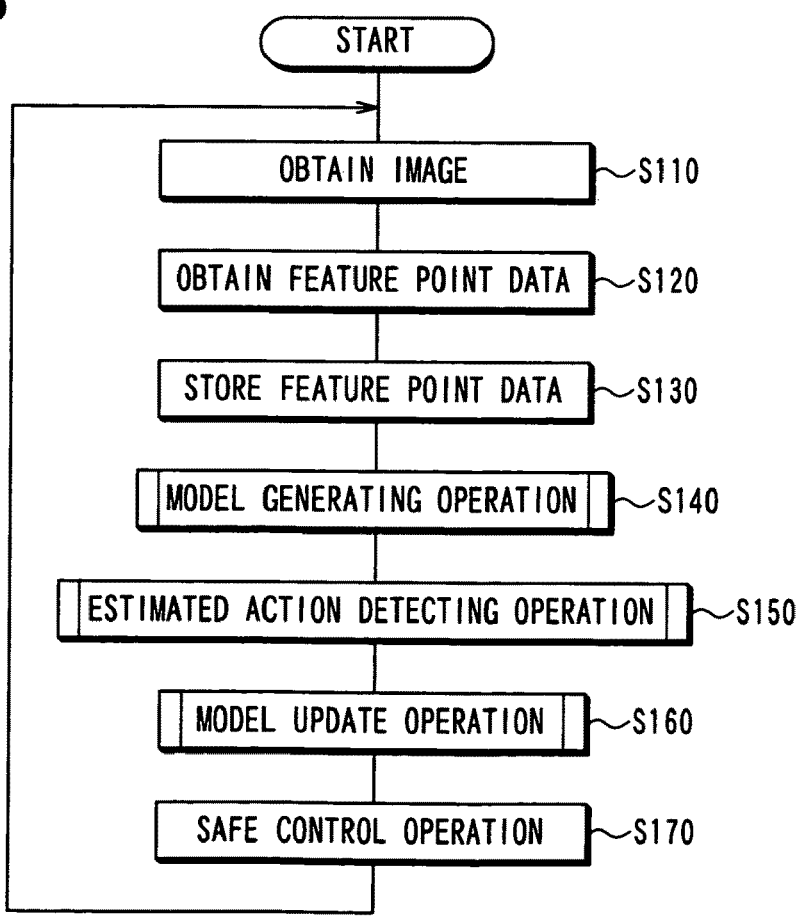
FIG. 3 is a flow chart showing an action estimating operation.

FIG. 3 is a flow chart showing the action estimating operation.

The action estimating operation is started at a predetermined starting time point before a driver enters a self-vehicle. For example, the starting time point is determined at a time point when a door of the self-vehicle is unlocked.

As shown in FIG. 3, when the action estimating operation is started, at S110, an image is first obtained from the image device 15. Subsequently, at S120, the feature list is compared with the image obtained at S110 so as to detect the coordinates (feature point data) of each feature point of a driver in the image.

For example, JP-A-2003-109015 discloses detection of a position of the feature point specified in an arm list, for example. Alternatively, JP-A-09-270010 discloses detection of a position of the feature point specified in a head list, for example. Therefore, detailed description of detection of the feature point is omitted.

At S130, all the obtained feature point data is associated with a time point, at which the feature point data is obtained, and stored in a predetermined area of the memory 10b. In this case, all the obtained feature point data is associated with a time point, at which the image is obtained. It is noted that the predetermined area is capable of storing at least a predetermined number N of all the feature point data obtained at S120 retroactively from the latest data. The predetermined number N is a natural number and may be set to a number of images, which can be obtained by using the image device 15 within one minute. Specifically, the predetermined number N may be 300, for example. Subsequently, at S140, a model generating operation is performed for generating a new action estimation model based on the feature point data obtained in a period in which a definite action is detected.

At S150, a predetermined number of feature point data, which is stored in the predetermined area at S130, is compared with each action estimation model stored in the storage device 10a, retroactively from the latest data. The predetermined number is, for example, five cycles in the present action estimating operation. Thereafter, based on the comparison result, the estimated action detecting operation is performed to detect an estimated action.

At S160, performs a model update operation. Specifically, when the action estimation model (new model) newly generated at S140 conforms to a driver compared with an action estimation model (old model) stored in the storage device 10a, the action estimation model stored in the storage device 10a is updated from the old model to the new model.

Subsequently, at S170, a safe control operation is performed for safely operating a self-vehicle according to the estimated action detected in the estimated action detecting operation at S150.

Specifically, in the safe control operation according to the present embodiment, when the estimated action detected in the estimated action detecting operation at S150 is a dangerous action, a speaker of the navigation device 21 is caused to output a voice and/or the navigation device 21 is caused to display a notice to let a user stop the currently performed dangerous action. The dangerous action is a specific action specified beforehand.

In the present embodiment, the dangerous action is a specific action, which may pose danger to a driving operation of a self-vehicle. Specifically, the dangerous action includes, for example, telephone manipulation, eating and drinking, passenger seat manipulation (continuous manipulation and a transitional action), rearview mirror manipulation, GB manipulation, CB manipulation, and the like.

Thereafter, the processing returns to S110 and repeats steps S110 to S170.

<Model Generating Operation>

Subsequently, the model generating operation performed at S140 of the action estimating operation will be described.

Figure 4:
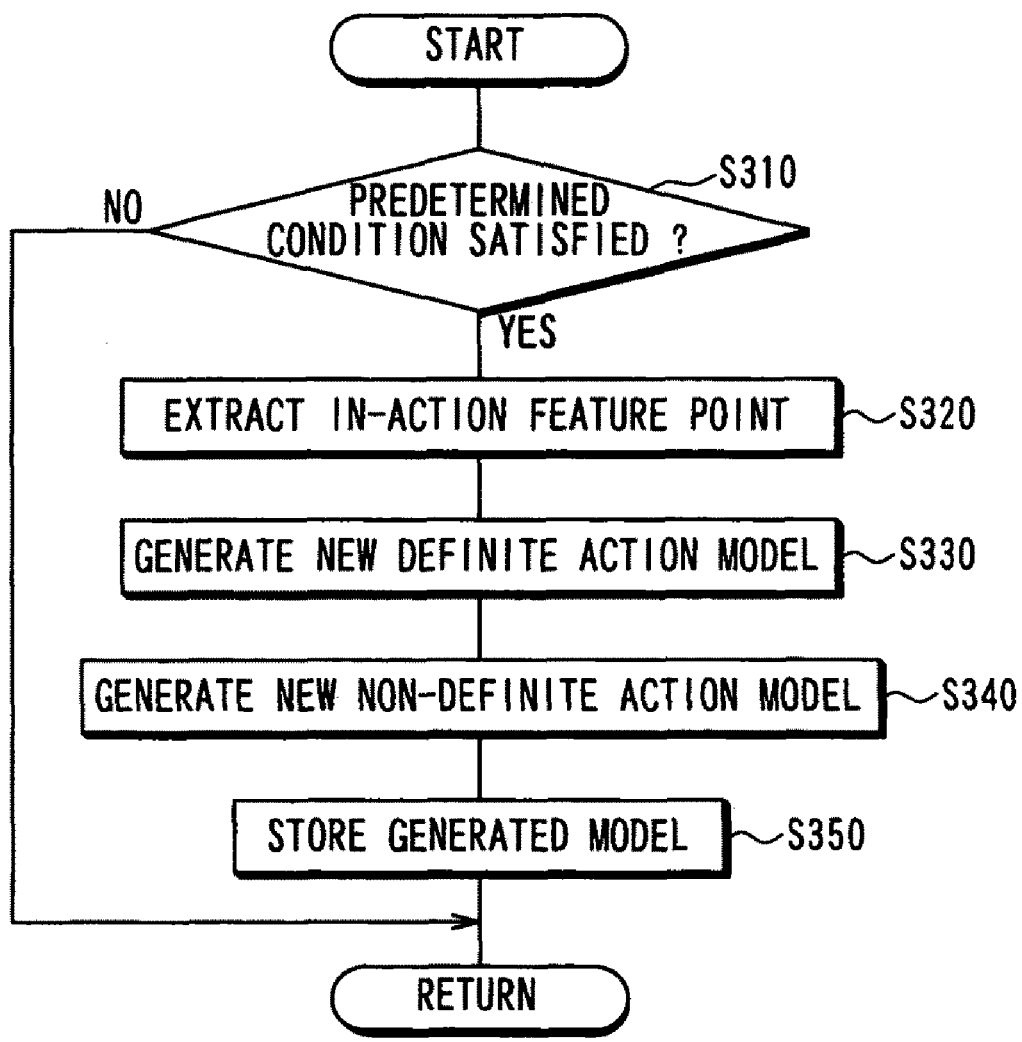
FIG. 4 is a flow chart showing a model generating operation.

FIG. 4 is a flow chart showing the model generating operation.

As shown in FIG. 4, in the beginning of the model generating operation, at S310, it is determined whether a predetermined condition is satisfied. In the present embodiment, the predetermined condition is satisfied when a number of items of the definite action information, which are generated in the definite information generation operation, becomes equal to or greater than a predetermined number. That is, the predetermined condition is satisfied when the predetermined number or more items of the definite action information are newly stored in a decision action information table. The predetermined condition may be satisfied when a predetermined number of items of the definite action information stored in the definite action information table are updated. Hereafter, each of newly generated items of the definite action information is denoted by new definite information.

When the predetermined condition is determined to be satisfied at S310, the processing proceeds to S320.

At S320, feature point data (in-action feature point) associated with a time point in a period between the specific start time and the specific end time and contained in each new definite information is extracted from feature point data stored in a predetermined area of the memory 10b. Specifically, at S320, for each new definite information, each feature point data detected at S120 is extracted as an in-action feature point in a period in which a definite action corresponding to the new definite information is specified.

At S330, according to an in-action feature point of each definite action, which corresponds to new definite information, a definite action estimation model corresponding to a definite action is newly generated. Each of the newly generated definite action estimation model is denoted by a new definite action model. For example, a definite action estimation model stored in the storage device 10a is read. Subsequently, a target point, which constitutes the definite action estimation model read from the storage device 10a, is converted to average coordinates of the in-action feature point for each definite action. Thereby, a new definite action model is generated.

Further, at S340, according to the in-action feature point, a non-definite action estimation model of a specific action other than a definite action is newly generated. Each newly generated non-definite action estimation model is denoted by a new non-definite action estimation model. The non-definite action estimation model is, for example, a continuous manipulation estimation model, such as a rearview mirror manipulation estimation model, a transitional action estimation model, a carry-on item manipulation estimation model, and a repeat action estimation model, which do not correspond to a definite action.

In the present embodiment, specifically, a new non-definite action estimation model is generated using the in-action feature point extracted at S320 and according to a predetermined correspondence between a position and a locus of a feature point, which constitute a non-definite action estimation model, and a position and/or a locus of a feature point in a definite action. The new non-definite action estimation model generated at S340 is obtained by modifying a target point, a start position, an end position and an intermediate point, a return point, and a specific point in an old non-definite action estimation model stored in the storage device 10a.

The correspondence described above is a relation predetermined by an experiment or the like and specified by a multi-regression formula and a data map.

At S350, the new definite action model generated at S330 and the new non-definite action estimation model generated at S340 are stored in a predetermined area of the memory 10b.

Thus, the model generating operation is terminated, and the processing returns to S150 of the action estimating operation.

When the predetermined condition is determined not to be satisfied at S310, that is, when the predetermined number of items of the definite action information are not newly stored in the decision action information table, the processing returns to S150 of the action estimating operation, without generating a new model.

In the model generating operation, a definite action estimation model is newly generated using an in-action feature point. In addition, a non-definite action estimation model is newly generated according to a predetermined correspondence between a position and a locus of a feature point, which constitute a non-definite action estimation model, and a position and/or a locus of a feature point in a definite action, using an in-action feature point.

<Estimated Action Detecting Operation>

Subsequently, the estimated action detecting operation performed at S150 of the action estimating operation will be described.

Figure 5:
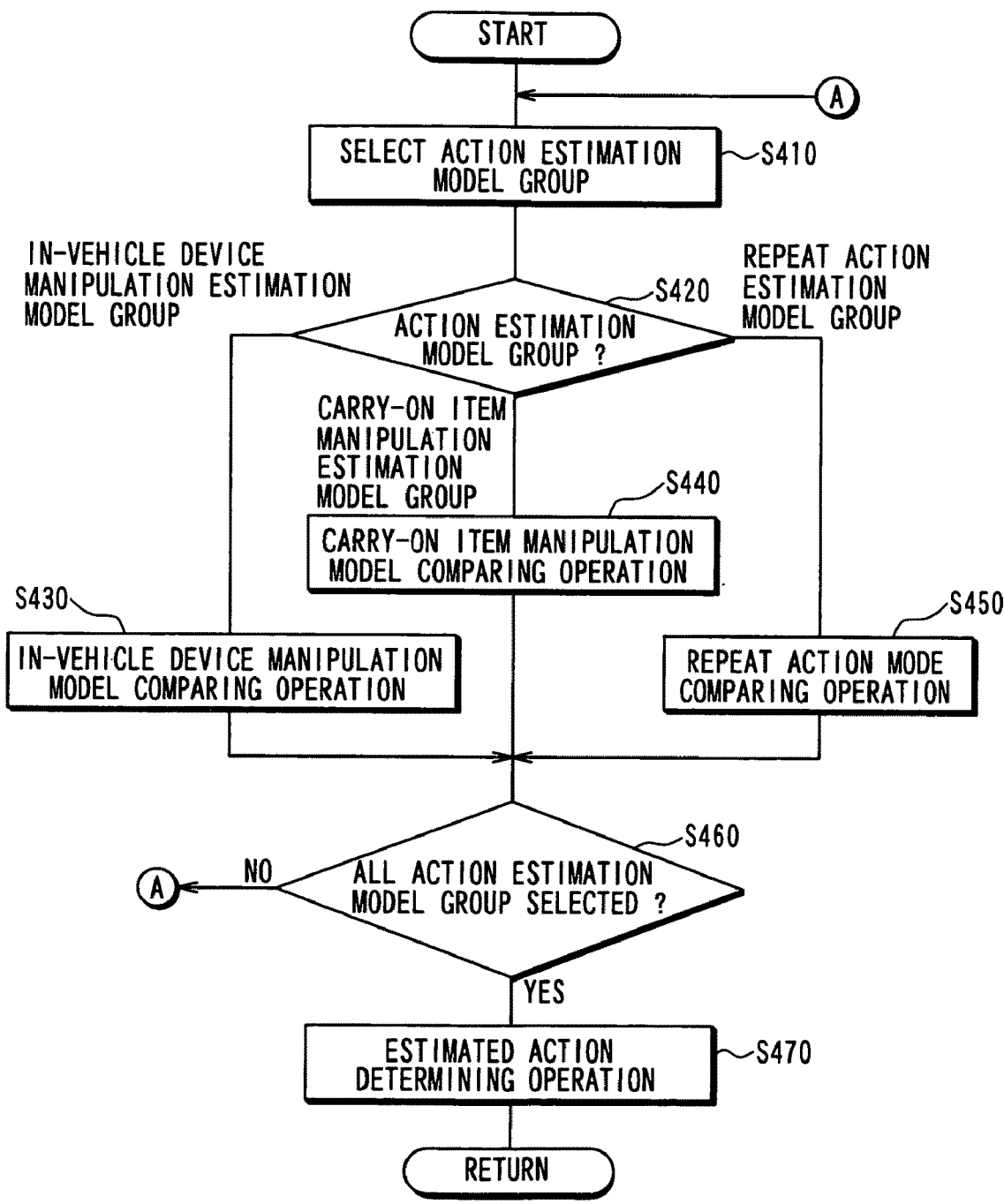
FIG. 5 is a flow chart showing an estimated action detecting operation.

FIG. 5 is a flow chart showing the estimated action detecting operation.

As shown in FIG. 5, in the beginning of the estimated action detecting operation, at S410, one action model group (comparison target), which is to be compared with feature point data, is first selected from an in-vehicle device manipulation estimation model group, a carry-on item manipulation estimation model group, and a repeat action estimation model group.

In the present embodiment, the in-vehicle device manipulation estimation model group is selected, immediately after beginning of the estimated action detecting operation. Subsequently, when the processing proceeds to S410, the carry-on item manipulation estimation model group is selected. Thereafter, when the processing again proceeds to S410, the repeat action estimation model group is selected.

Subsequently, at S420, it is determined whether the comparison target selected at S410 is any one of the in-vehicle device manipulation estimation model group, the carry-on item manipulation estimation model group, and the repeat action estimation model group.

When the comparison target is determined to be the in-vehicle device manipulation estimation model group at S420, the processing proceeds to S430.

At S430, an in-vehicle device manipulation model comparing operation is performed. Specifically, at S430, feature point data is compared with each action estimation model contained in the in-vehicle device manipulation estimation model group. Thus, a specific action corresponding to an action estimation model, which satisfies a predetermined first condition, is detected as a potential estimated action.

More specifically, in the in-vehicle device manipulation model comparing operation according to the present embodiment, the predetermined first condition is satisfied in a case where a determination angle between feature point data (locus), which is continuously detected with time progress and a locus of each action estimation model is equal to or less than a predetermined angle. Above all, an action estimation model, which has the minimum determination angle, is employed. That is, an action estimation model, which has the highest coincidence is employed.

When the comparison target selected at S410 is determined to be a carry-on item manipulation estimation model group at S420, the processing proceeds to S440.

At S440, a carry-on item manipulation model comparing operation is performed. Specifically, at S440, feature point data is compared with each action estimation model contained in the carry-on item manipulation model group. Thus, a specific action corresponding to an action estimation model, which satisfies a predetermined second condition, is detected as a potential estimated action.

More specifically, in the carry-on item manipulation model comparing operation according to the present embodiment, all action estimation models, in which an action angle θ is in an allowable range are extracted. The action angle is between a moving direction, in which feature point data continuously detected with time progress, and an action direction in which an action point moves from feature point data to a return point. Among the extracted action estimation models, action estimation models in which feature point data (relative feature point), which is converted into a relative coordinate having a return point as a zero point, is in a return region or a pass-by region is employed. Further, among the action estimation models, an action estimation model, which satisfies the predetermined second condition, is employed. That is, an action estimation model, which has the highest coincidence is employed. In the carry-on item manipulation model comparing operation according to the present embodiment, an action estimation model, in which the action angle θ is out of a detection allowable range, and carry-on item manipulation, which corresponds to an action estimation model in which relative feature point is out of a return region or a pass-by region, are excluded from a potential estimated action.

When the comparison target selected at S410 is determined to be a repeat action estimation model group at S420, the processing proceeds to S450.

At S450, a repeat action model comparing operation is performed. Specifically, at S450, feature point data is compared with each action estimation model contained in the repeat action estimation model group. Thus, a repeat action corresponding to an action estimation model, which satisfies a predetermined third condition, is detected as a potential estimated action.

More specifically, in the repeat action model comparing operation according to the present embodiment, an action estimation model satisfying the following conditions is determined to satisfy the predetermined third condition: i) feature point data (converted feature point), which is converted into a relative coordinate corresponding to each action estimation model is in an allowable region of each action estimation model; and ii) a total distance from the converted feature point to a specific point of each action estimation model is shortest. That is, an action estimation model, which has the highest coincidence is employed. In the repeat action model comparing operation according to the present embodiment, when the converted feature point is located out of an allowable region of an action estimation model, a repeat action corresponding to the action estimation model is excluded from a potential estimated action. Subsequently, at S460, it is determined whether all the in-vehicle device manipulation estimation model group, the carry-on item manipulation estimation model group, and the repeat action estimation model groups are selected at S410. When all the model groups are determined not to be selected, the processing returns to S410.

Alternatively, when all the model groups are determined to be selected, the processing proceeds to S470.

At S470, an estimated action determining operation is performed. Specifically, at S470, an estimated action is detected from the potential estimated action detected in the in-vehicle device manipulation model comparing operation, the carry-on item manipulation model comparing operation, and the repeat action model comparing operation.

More specifically, in the estimated action determining operation according to the present embodiment, when the same specific action is detected as a potential estimated action continually for predetermined cycles, the potential estimated action is detected as an estimated action.

Thereafter, the processing returns to S160 of the action estimating operation.

In the estimated action detecting operation according to the present embodiment, a feature point data detected from an image is compared with each action estimation model, and thereby a specific action corresponding to an action estimation model having highest coincidence with the feature point data is detected as an estimated action.

<Model Update Operation>

Subsequently, the model update operation performed at S160 of the action estimating operation will be described.

Figure 6:
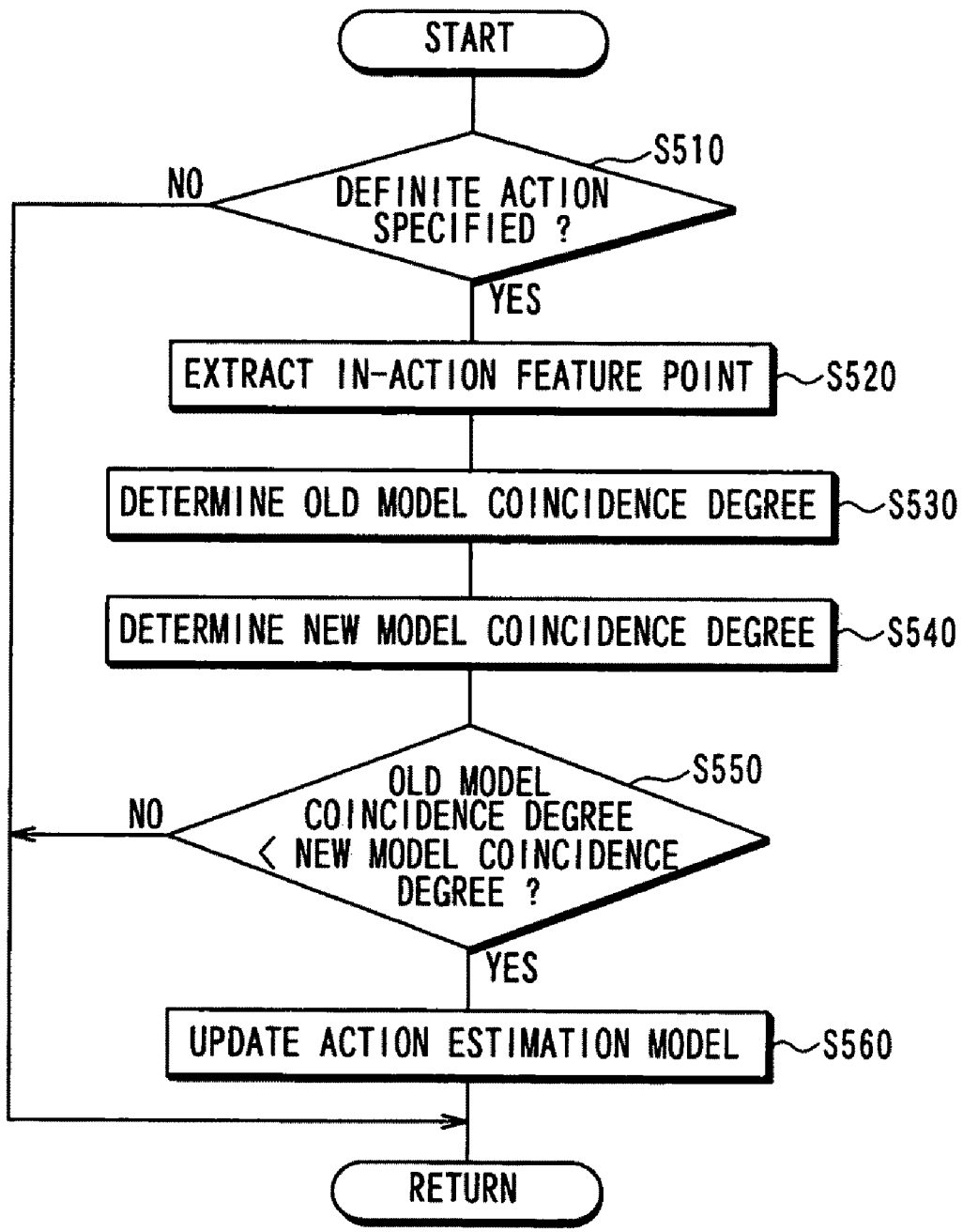
FIG. 6 is a flow chart showing a model update operation.

FIG. 6 is a flow chart showing the model update operation.

As shown in FIG. 6, in the beginning of the model update operation, at S510, it is first determined whether a previous processing of the model generating operation is terminated, and it is determined whether a new definite action is specified in the definite action information generating operation. When it is determined that a new definite action is specified, the processing proceeds to S520. That is, when the previous processing of the model generating operation is terminated, and when a new definite action information is generated, the processing proceeds to S520.

At S520, an in-action feature point of the newly specified definite action is extracted from feature point data stored in a predetermined area of the memory 10b.

At S530, the in-action feature point extracted in S520 is compared with an old model, which corresponds to the definite action. Thus, an old model coincidence degree indicating a degree of coincidence between the old model and the in-action feature point is determined. Specifically, in the present embodiment, a value is determined as the old model coincidence degree based on an angle between the in-action feature point (locus) continuously detected with time progress and a locus of the old model. It is noted that the old model coincidence degree increases, as the angle between the locus of the in-action feature point and the locus of the old model decreases.

At S540, the in-action feature point extracted in S520 is, compared with a new model, which corresponds to the definite action. Thus, a new model coincidence degree indicating a degree of coincidence between the new model and the in-action feature point is determined. Specifically, in the present embodiment, a value is determined as the new model coincidence degree based on an angle between the in-action feature point (locus) continuously detected with time progress and a locus of the new model. It is noted that the new model coincidence degree increases, as the angle between the locus of the in-action feature point and the locus of the new model decreases.

At S550, it is determined whether the new model coincidence degree determined at S540 is greater than the old model coincidence degree determined at S530. When the new model coincidence degree is determined to be greater than the old model coincidence degree, the processing proceeds to S560.

That is, when the new definite action model conforms to a driver, compared with the old definite action model, the processing proceeds to S560.

At S560, the old model stored in the storage device 10a is updated to the new definite action model and a new non-definite model generated in the previous model generating operation.

Thus, the model update operation is terminated, and the processing returns to S170 of the action estimating operation.

At S510, when a new definite action is determined not to be specified after terminating the previous model generating operation, the model update operation is terminated without updating of the old model stored in the storage device 10a to a new definite action model and a new non-definite model. Thus, the processing returns to S170 of the action estimating operation.

At S540, when the new model coincidence degree is determined to be less than the old model coincidence degree, the old definite action model is determined to conform to a driver, compared with the new definite action model. In this case, the model update operation is terminated without updating of the old model stored in the storage device 10a to a new definite action model and a new non-definite model. Thus, the processing returns to S170 of the action estimating operation.

That is, in the model update operation, when the new definite action model conforms to a driver, compared with the old definite action model, the action estimation model stored in the storage device 10a is updated from the old model to the new model. Alternatively, in the model update operation, when the old definite action model conforms to a driver, compared with the new definite action model, the action estimation model stored in the storage device 10a is maintained without being updated.

<Effect>

As described above, in the action estimation system 1, the return point, the start position, the end position, the intermediate point, and the specific point, which constitute the action estimation model generated beforehand, are modified based on the feature point data detected from a photographed image. Therefore, the new action estimation model (new definite action model and new non-definite action estimation model) is generated to coincide with each occupant.

In the action estimation system 1 according to the present embodiment, when the new definite action model conforms to a driver, compared with the old definite action model, the action estimation model stored in the storage device 10a is updated from the old model to the new model. Accordingly, the action estimation model is specialized for a driver and stored in the storage device 10a.

The action estimation system 1 detects the estimated action by comparing the feature point data with each action estimation model stored in the storage device 10a. Therefore, erroneous detection resulting from individual difference between occupants can be reduced. As a result, according to the action estimation system 1, detection accuracy of the estimated action can be enhanced.

Further, the action estimation system 1 is configured to perform a safe control when a driver performs dangerous action, and thereby a safety operation of a driver can be maintained.

Other Embodiments

For example, at S310 in the model generating operation according to the above embodiment, the predetermined condition for generating a new model is satisfied when a predetermined number or more of items of the definite action information are generated. It is noted that the predetermined condition is not limited to that in the above embodiment. For example, the predetermined condition may be satisfied when one item of the definite action information is newly generated. Alternatively, the predetermined condition may be satisfied when a definite action is continually performed for more than a predetermined period.

In the definite action information generating operation according to the above embodiment, only a continuous manipulation of a specified manipulation device is determined as a definite action. It is noted that a specific action determined as a definite action is not limited to that in the above embodiment. For example, a transitional action between specified manipulation devices may be determined as a definite action.

In this case, when another manipulation signal is inputted within a predetermined period, such as 3 seconds, after one manipulation signal is inputted, a transitional action between manipulation devices may be detected as a definite action. For example, when a lever manipulation signal is inputted to the image processor 10 within a predetermined period after a steering wheel manipulation signal is inputted to the image processor 10, a transitional action from the steering wheel to the shift lever may be specified as a definite action. Alternatively, when a navigation manipulation signal is inputted to the image processor 10 within a predetermined period after a steering wheel manipulation signal is inputted to the image processor 10, a transitional action from the steering wheel to the navigation device 21 may be specified as a definite action.

Further, in the model update operation according to the above embodiment, when the new model coincidence degree is greater than the old model coincidence degree, the old model stored in the storage device 10a is updated to the new definite action model and the non-definite model. It is noted that the condition for updating the model is not limited to that of the above embodiment. For example, a model may be updated immediately after a new definite action model and a new non-definite action estimation model are generated.

Further, at S170 in the action estimating operation according to the above embodiment, the safe control operation is performed such that an occupant is notified to stop a dangerous action via the speaker and the display device of the navigation device 21. It is noted that the safe control operation is not limited to that in the above embodiment. For example, when a dangerous action is detected as an estimated action, binding force of a seat belt of a self-vehicle may be increased. Alternatively, a control instruction may be outputted to the airconditioner control device 22 so as to blow cool air to an occupant, for example. Alternatively, in this case, a brake actuator, a throttle actuator, and a transmission may be controlled to stop a self-vehicle.

In the above embodiment, the action estimation system 1 is provided in an automobile. It is noted that the action estimation system 1 need not be provided in an automobile. For example, the action estimation system 1 may be provided in another movable object, such as an airplane, a train, or a two-wheeled vehicle.

In the above embodiment, the function produced by executing S110 in the action estimating operation is an example of an image acquisition unit. The function produced by executing S120 in the action estimating operation is an example of a feature point detection unit. The storage device 10a is an example of a model storing unit. The function produced by executing S150 (estimated action detecting operation) in the action estimating operation is an example of an action estimating unit.

The function produced by executing the definite action information generating operation is an example of a definite action detecting unit. The function produced by executing S140 (model generating operation) in the action estimating operation is an example of a definite action model generating unit, a non-definite action model generating unit. The function produced by executing S160 (model update operation) in the action estimating operation is an example of a model update unit. The function produced by executing S170 in the action estimating operation is an example of a safe control unit.

The function produced by executing S530 in the model update operation is an example of an old model comparison unit. The function produced by executing S540 is an example of a new model comparison unit.

Summarizing the above description, each time an image acquisition unit repeatedly obtains a photographic image including an occupant in a movable body, a feature point detection unit detects feature point data indicating a position of a feature point of the occupant in the photographic image. In addition, an action estimating unit compares the position or a locus of the detected feature point, when the occupant performs each specific action, with each action estimation model defined for each specific action and stored in a model storage unit. The action estimating apparatus detects a specific action, which is associated with an action estimation model highest in a coincidence degree, as an estimated action. The feature point is at least one predetermined point of a person's body, and the specific action is an action, which an occupant may perform.

In the action estimating apparatus, a definite action detecting unit detects that an occupant is performing a definite action using a different method from the comparison between the feature point data and the action estimation model. The definite action is at least one predetermined action of a specific action.

An in-action feature point is the feature point data detected by the feature point detection unit in a period in which the definite action being performed is detected. A definite action model generating unit modifies the position or the locus of the feature point, which constitutes a definite action estimation model, according to the in-action feature point, thereby to generate a new definite action estimation model. Further, a non-definite action model generating unit generates a new non-definite action estimation model using the in-action feature point according to a predetermined correspondence between the position or the locus of the feature point, which constitutes the non-definite action estimation model, and the position or the locus of the feature point when the occupant is performing the definite action. The definite action estimation model is an action estimation model corresponding to definite action. The non-definite action estimation model is an action estimation model corresponding to the non-definite action, which is a specific action other than the definite action in the specific action.

A model update unit performs model update to: update the definite action estimation model and the non-definite action estimation model (old models generated beforehand) stored in the model storage unit to the definite action estimation model generated by the definite action model generating unit and the non-definite action estimation model generated by the non-definite action model generating unit (new models newly generated).

The action estimating apparatus updates the action estimation model generated beforehand according to the feature point data obtained from the photographic image of the occupant, thereby to generate the action estimation model, which is suited to each occupant.

Thus, the action estimation apparatus detects the estimated action by comparing the newly generated action estimation model with the feature point data. Therefore, erroneous detection resulting from individual difference between occupants can be reduced. As a result, according to the action estimation apparatus, detection accuracy of the estimated action can be enhanced.

The model update unit of the action estimating apparatus may include an old model comparison unit and a new model comparison unit. In response to detection of a subsequent definite action being performed, the old model comparison unit compares a subsequent in-action feature point, which is an in-action feature point of the definite action, with the old model of the definite action to determine an old model coincidence degree indicating the coincidence degree. The new model comparison unit compares the subsequent in-action feature point with the new model of the definite action to determine a model coincidence degree indicating the coincidence degree. The model update unit needs to perform model update when the new model coincidence degree is higher than the old model coincidence degree.

The action estimating apparatus updates the action estimation model when the action estimation model (new model) newly generated conforms to an occupant compared with the action estimation model (old model) generated beforehand.

The action estimating apparatus stores the action estimation model, which is specialized for a specific occupant. Thus, erroneous detection of the action of the occupant can be further reduced.

When the action for manipulating a manipulation device mounted in the movable object is set as a definite action, the definite action detecting unit of the action estimating apparatus may preferably include a manipulation signal acquisition unit for obtaining a manipulation signal indicating that the manipulation device is being manipulated. Thus, the definite action detecting unit detects that definite action is being performed in accordance with the obtained manipulation signal.

When an automobile is assumed as a movable object, a steering wheel, a shift lever, a glove box, a console box, a navigation device, an airconditioner, and the like are considered as manipulation devices.

A specific action of an occupant, which may exert an adverse effect on operation of a movable object, may be set as a dangerous action. In this case, the action estimating apparatus may include a safe control unit for performing a safe control for safely controlling the movable object when the estimated action detected by the estimated action detecting unit is the dangerous action.

Thus, the action estimation apparatus is configured to perform a safe control when an occupant performs the dangerous action, and thereby a safety operation of a mobile object can be maintained.

A program may function as each unit of the action estimating apparatus when executed by a computer.

The program may be stored in a computer-readable medium such as a DVD-ROM, a CD-ROM, a hard disk, and the like and arbitrary loaded and started by a computer.

The above processings such as calculations and determinations are not limited being executed by the image processor 10. The control unit may have various structures including the image processor 10 shown as an example.

The above processings such as calculations and determinations may be performed by any one or any combinations of software, an electric circuit, a mechanical device, and the like.

The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. An action estimating apparatus comprising:
   an image acquisition unit configured to repeatedly obtain a photographic image of an occupant of a movable object;
   a feature point detection unit configured to obtain feature point data indicating a position of a feature point of the occupant in the photographic image in response to obtaining of the photographic image by the image acquisition unit, the feature point being at least one predetermined point of a person's body;
   a model storage unit configured to store action estimation models each defining a position or a locus of the feature point in each specific action, which an occupant may perform;
   an action estimating unit configured to compare the feature point data obtained by the feature point detection unit with each of the action estimation models stored in the model storage unit to detect an estimated action, which is the specific action associated with the action estimation model, which is highest in a coincident degree;
   a manipulation signal acquisition unit configured to obtain manipulation signals each indicating that a predetermined manipulation device equipped in the movable object is manipulated;
   a definite action detecting unit configured to implement at least one of:
     detection of a specific action for manipulating the manipulation device corresponding to each of the manipulation signals from the manipulation signals, which are obtained by the manipulation signal acquisition unit, as the definite action performed by the occupant and detection of a start time when input of the manipulation signal, which corresponds to the detected definite action, starts and an end time when the input of the manipulation signal ends; and
     detection of a specific action, in which a hand moves from the manipulation device, which corresponds to a first manipulation signal, to the manipulation device, which corresponds to a second manipulation signal, as the definite action based on the manipulation signals, which are obtained by the manipulation signal acquisition unit, and detection of the start time when the input of the first manipulation signal ends and the end time when the input of the second manipulation signal starts;
   a definite action model generating unit configured to generate a new definite action estimation model by modifying a position or a locus of the feature point, which constitutes a definite action estimation model, according to an in-action feature point corresponding to each of the definite actions detected by the definite action detection unit, the in-action feature point being each of the feature point data detected by the feature point detection unit in each period from the start time to the end time detected by the definite action detection unit, the action estimation model corresponding to each of the definite actions detected by the definite action detection unit;
   a non-definite action model generating unit configured to generate a new non-definite action estimation model with respect to each non-definite action model stored in the model storage unit using the in-action feature point according to a predetermined correspondence between a position or a locus of the feature point when the occupant performs the definite action and a position or a locus of the feature point, which constitutes the non-definite action estimation model, which is the action estimation model corresponding to a non-definite action,
   wherein the definite action model corresponds to the definite action being a continuous manipulation of the manipulation device by the occupant,
   wherein the non-definite action model corresponds to the non-definite action being a specific action, which cannot be detected as the definite action, and is other than the definition action; and
   a model update unit configured to update the definite action estimation model and the non-definite action estimation model stored in the model storage unit and corresponding to the definite action estimation model generated by the definite action model generating unit and the non-definite action estimation model generated by the non-definite action model generating unit, respectively to the newly generated definite action estimation model and the newly generated non-definite action estimation model,
   wherein the model update unit includes an old model comparison unit configured to:
     compare a subsequent in-action feature point, which is the in-action feature point of the definite action, with an old definite action model of the definite action, which is the definite action estimation model stored in the model storage unit, when the definite action detecting unit subsequently detects the definite action; and
     determine a coincidence degree as an old model coincidence degree,
   wherein the model update unit further includes a new model comparison unit configured to:
     compare the subsequent in-action feature point with the new definite action estimation model generated by the definite action model generating unit; and
     determine the coincidence degree as a new model coincidence degree,
   wherein the model update unit is configured to perform the model update when the new model coincidence degree determined by the new model comparison unit is higher than the old model coincidence degree determined by the old model comparison unit.

2. The action estimating apparatus according to claim 1, further comprising:
   a safe control unit configured to perform a safe control for safely controlling the movable object when the estimated action estimated by the estimated action detecting unit is a dangerous action,
   wherein the dangerous action is one specific action having a possibility to exert an adverse effect on an operation of the movable object when performed by the occupant.

3. A non-transitory computer readable medium storing there on a program product comprising instructions being executed by a computer, the instructions for causing the computer to function as each unit of the action estimating apparatus according to claim 1.

4. The action estimating apparatus according to claim 1, wherein a value is determined as the new model coincidence degree based on an angle between the in-action feature point continuously detected as time progresses and a locus of a new model.

* * * * *